United States Patent [19]

Jarrett

[11] 4,187,346

[45] Feb. 5, 1980

[54] CONTROLLED PERMEATION PROCESS FOR FIREPROOFING WOOD

[75] Inventor: George W. Jarrett, Jackson, Miss.

[73] Assignee: Shelby-Williams Industries, Inc., Morristown, Tenn.

[21] Appl. No.: 935,861

[22] Filed: Aug. 22, 1978

[51] Int. Cl.[2] .......................... B05D 3/00; B05D 3/02; B05D 1/18; B32B 21/04

[52] U.S. Cl. .................................... 428/342; 427/297; 427/317; 427/440; 428/537; 428/921

[58] Field of Search ............... 427/297, 440, 317, 397, 427/392 R, 393; 118/50; 428/921, 537, 342

[56] References Cited

U.S. PATENT DOCUMENTS

| | | | |
|---|---|---|---|
| 691,812 | 1/1902 | Rucker | 427/297 X |
| 1,702,285 | 2/1929 | Vivas | 427/297 |
| 2,838,424 | 6/1958 | DePew et al. | 427/297 |
| 3,968,276 | 7/1976 | Allen | 427/297 |
| 4,062,991 | 12/1977 | Kyte et al. | 427/297 |

FOREIGN PATENT DOCUMENTS

| | | | |
|---|---|---|---|
| 2363097 | 10/1975 | Fed. Rep. of Germany | 427/297 |

*Primary Examiner*—Michael R. Lusignan
*Attorney, Agent, or Firm*—Cushman, Darby & Cushman

[57] ABSTRACT

Fireproofing of wood and the variety of hardwoods typically utilized in the manufacture of furniture is provided by a process of controlled permeation of a solution composed of a combination of a halide salt of a Group I or Group II metal of the Periodic Table of Elements and an ammonium salt which upon impregnation precipitates in the cellular structure of the treated wood. Controlled permeation of furniture wood to a depth of about ⅛ of an inch to 3 inches is provided by evacuating and expanding the cellular structure of the wood by utilizing a vacuum chamber, or a heat chamber for heating the wood to temperatures of about 220° F. or a combination thereof to activate the surface and a portion of the subsurface of the cellular structure of the wood for absorption and adsorption of the solution of fire retardant compounds providing a controlled impregnation of the furniture hardwood. Fire retardant compounds drawn into the surface and subsurface structure of the wood may then be sealed into the furniture wood by utilizing traditional furniture finishing procedures.

33 Claims, No Drawings

CONTROLLED PERMEATION PROCESS FOR FIREPROOFING WOOD

BACKGROUND OF THE INVENTION

1. Field of the Invention

The present invention relates to a process for the preparation of fireproof furniture hardwoods and for fireproofing wood products in general by utilizing a controlled permeation of a fire retardant solution composed of a combination of a halide salt of a Group I or Group II metal of the Periodic Table of Elements and an ammonium salt which after impregnation precipitates as an ammonium halide in the cellular structure of the treated wood. More particularly, the invention pertains to a process that is compatible with traditional furniture finishing techniques for manufacturing fireproof furniture utilizing a controlled permeation of a fire retardant solution in furniture hardwood by the evacuation and expansion of the cellular structure of the wood prior to the controlled impregnation of the surface of the treated wood to depths of about $\frac{1}{8}$ of an inch to about 3 inches wherein the salts of the treating solution react and are deposited within the cellular structure of the treated wood.

2. Description of the Prior Art

A number of processes and treating compositions exists in the prior art for the treatment of wood and wood products for imparting fire resistance, preventing decay and insect proofing for softwood and softwood products utilized primarily in an exterior environment. In addition to pertaining to the treatment of softwoods the prior art does not utilize a controlled impregnation of the wood but instead relies upon various pitch or tar coatings as in the case of telephone poles or utilizes techniques designed to provide a saturation of the cellular structure to the core of the wood with the treating solution. Representative of processes for the treatment of softwoods for exterior applications are U.S. Pat. Nos. 3,159,503; 3,306,765 and 3,427,186.

In U.S. Pat. No. 675,826 a process for the fireproofing and preserving wood is disclosed wherein salts of zinc or magnesium are combined with ammonium salts to form new crystals and combinations that are much less soluble in water than either the magnesium or zinc salts and which are utilized to impregnate a more or less dry wood which is thereafter subjected to an ammoniacal atmosphere to convert the metallic salts in the wood to a greater or less extent to basic salts which are nearly insoluble in water, and finally into hydrates. Furthermore, in this patent a high vacuum is utilized along with a pressure of 150 psi on the impregnating solution which by the combined effect of vacuum and pressure forces the impregnation solution to the heart of the softwood which usually takes about 12 hours.

The prior art procedures for fireproofing softwoods by saturating the wood to the core are in marked contrast to the present invention for fireproofing hardwood products generally utilized in the furniture industry. Furthermore, the softwoods are structurally different from hardwoods in that softwoods are composed of tracheid and parenchyma cells which are generally more porous than hardwoods which are composed of vessel members, fibers and the more compact parenchyma cells. As a result of the difference in cellular structure, the softwoods have generally been more receptive to treatment with fluids whereas the hardwoods have generally resisted fireproofing treatments utilized in the prior art for softwoods. In addition, the procedures and fire retardant compounds heretofore employed are not compatible with finishing techniques employed for furniture and have severely interferred with the appearance of the grain and texture of the wood.

It has been discovered that in contrast to the prior art, fireproofing of hardwoods and softwoods alike may be accomplished by utilizing a controlled permeation of wood with a solution composed of a combination of a halide salt selected from a Group I or Group II metal of the Periodic Table of Elements and an ammonium salt which upon absorption and adsorption into the cellular structure of the wood reacts and precipitates as an ammonium halide in the treated wood. Controlled permeation of the fire resistant solution is accomplished by treating wood to depths from about $\frac{1}{8}$ of an inch to about 3 inches where the diameter of the wood ranges from about 10 inches to 10 inches depending on the type of wood and does not utilize the complete saturation of the entire cellular structure to the core of the wood product. The present invention generally employs a surface penetration of the wood that constitutes a treatment of from about 5 to about 20% of the entire area of the fireproofed wood. It has been discovered that this surface treatment of wood in accordance with the invention is effective in fireproofing the exterior of the wood and protecting and insulating the internal core of the wood from the combination of heat and oxygen necessary for combustion. Treatment of hardwoods with the flame resistant process of the present invention provides an effective fire and smoke resistant product that withstands burning and smoldering in open flame and temperatures up to 2,000° F.

The present process for the controlled permeation of a solution which is believed to react in the cellular structure of the wood product to provide a fire resistant wood is accomplished by expanding and evacuating the cellular structure of the wood to be treated by vacuum pressure, heating, or a combination of heat and pressure to activate the cellular structure of the wood prior to its impregnation with a fire retarding compound. Preferably, the fire resistant treatment of the invention is applicable to furniture wood products since the controlled permeation of the treating solution is compatible with high quality furniture to achieve the advantages of the invention due to the cellular structure of the wood, however, the invention is equally applicable to softwoods which require a higher percentage of permeation of treating solution in relation to the total diameter or thickness in view of the permeability of the cellular structure of the wood to oxygen, the relative flamability of the constituents in the cellular structure and the relative size of cells.

The prior art in contrast pertains to softwoods that are treated to the core utilizing impregnation procedures and fire retardant compositions that for the most part are not compatible with furniture manufacture. Furthermore, the prior art has employed steaming procedures or subjecting the softwoods to an atmosphere containing a high percentage of moisture to soften the cells and make them more pliable. The present invention in contrast employs dry wood and dry heat in attaining the advantages of the method and composition utilized in the invention. In addition, the prior art processes and flame retardant compounds have required the use of sophisticated pressure vessels and vacuum chambers to result in the impregnation and treatment of softwood products. Furthermore, some of the prior art procedures require the subsequent processing of the fire retardant compositions by utilizing drying kilns and chemical reaction in ammoniacal atmospheres for extended periods of time which further increase expense in processing and imposing corrosion resistance requirements for pressure and vacuum vessels.

The prior art processes for imparting flame resistance to wood further exhibits the disadvantage of requiring extended periods of time to introduce fire resistant compounds into the cellular structure of the wood which add increased expenditures in time, labor and material required to impart flame resistance to the wood products thereby causing treated woods to be much more expensive in comparison with untreated woods. The problems resulting from the pressure and vacuum conditions and the requirements for reduced fire, smoke and smoldering capacities of hardwood products generally employed in household furnishings and the inability of many of these processes and procedures to accommodate finishing procedures and techniques ordinarily employed in the furniture industry is considered as the reason for the failure of the prior art to provide a viable process for imparting flame resistance to furniture products.

The propagation of fire and deaths from fires is in part fostered by the combustability and the evolution of smoke by contemporary wood furnishings, particularly in cases where the building itself is fireproof. This is particularly apparent in dinner clubs, restaurants, mobile homes, hospitals and nursing homes where the use of furniture that would not burn would be justified regardless of cost. As a result there exist a requirement for an economical process for fireproofing hardwoods of the variety utilized in furniture which does not interfere with the visual appearance of the wood and is compatible with the finishing techniques generally employed in the manufacture of furniture.

SUMMARY OF THE INVENTION

The disadvantages and limitations of the prior art procedures for imparting flame resistance to softwood and softwood products including the expensive and elaborate equipment and processing required for imparting flame resistance to softwoods are obviated by the present invention which provides for a process of controlled permeation for imparting flame resistance to both softwoods and hardwoods. The process of the invention for imparting fire resistance to wood products includes the controlled permeation and treatment of wood to depths of about between ⅛ of an inch to about 3 inches for wood having a diameter or thickness of about 10 inches to 10 inches depending upon the type of wood with a solution composed of a combination of a halide salt of a Group I or Group II metal of the Periodic Table of Elements and an ammonium salt in a suitable vehicle which upon impregnation is believed to react and form an ammonium halide in the cellular structure of the treated wood.

The present invention is the product of an extensive research investigation. In the course of this study numerous tests were run utilizing a variety of organic and inorganic fireproofing compositions and employing a variety of procedures. As a result of these investigations, it was discovered that wood could not only be rendered fireproof and a reduction in the evolution in smoke and gas when subjected to heat and/or flame but also substantially strengthened in utilizing the compositions and procedures of the invention.

Generally, the advantages of the invention are achieved when permeation of the fire retardant compound over the surface of the wood constitutes a treatment of 100% of the entire surface area of the fireproofed wood. It will be understood that the percent of treatment and the depth of controlled penetration is related not only to the thickness or diameter of the treated wood but also the particular species of wood being treated. In the case of hardwoods having extremely limited porosity and a compact cellular structure as in the case of Teak and Cherry the depth of controlled penetration may be only ⅛ of an inch to ¼ of an inch where the wood has a thickness or cross-section of about 2 inches to 3 inches to achieve the advantages of the invention while the more porous woods and woods having volatile compounds in the cellular structure such as willow and pine the controlled penetration should be about 2 inches to 3 inches where the wood has a thickness or cross-section of about 3 inches to 6 inches.

It is believed that the advantages of controlled permeation of the present invention result from the adsorbed and absorbed compounds not only preventing the propagation of fire but also acting as an insulating barrier which prevents the permeation of oxygen and materials necessary to result in combustion from the inside out. The process of the invention not only fireproofs wood to temperatures of about 3,000° F. but also significantly increases the strength, hardness and durability of the furniture wood. In addition, the process of the invention is economical and may be employed to produce furniture at a price competitive with untreated furniture.

Controlled permeation of fire resistant wood products prepared in accordance with the invention is achieved by expanding and evacuating the cellular structure of the wood by utilizing either a vacuum chamber or by heating the wood to a temperature of about 220° F. or utilizing a combination thereof and thereafter allowing atmospheric pressure and cellular contraction to effectuate a controlled impregnation of the hardwood by the fire retardant solution. The depth of desired penetration is determined in regard to the size, shape and species of wood to be treated as will hereinafter be described in greater detail and thereafter the retardant compositions are sealed in the furniture wood by utilizing traditional furniture finishing procedures.

The invention does not require the employment of elaborate pressure equipment or the employment of corrosive resistant materials to produce fire retardant furniture products that may be marketed at a cost comparable with untreated furniture. In addition, the chemical compositions employed to provide fire retardancy to the treated wood are inexpensive and do not impede the subsequent finishing procedures of the furniture product to provide a treated furniture that is virtually identical in appearance to untreated furniture.

The fireproofing solutions of the present invention utilized for protecting and strengthening while hardening hardwood of the type used in furniture employ a combination of a halide of a salt of a Group I or Group II metal of the Periodic Table of Elements and an ammonium salt which upon reaction forms an ammonium halide in the cellular structure of the treated wood. Fireproofing solutions of about 7% to 8% by weight metal halide to 7% to 9% by weight ammonium salt may be employed to achieve the advantages of the invention. The molar concentration of the combined salt solutions is preferably in the range of about 71 M to 75 M. From the standpoint of economics and availability it is preferable to use ammonium sulfate as the ammonium salt and a metal salt such as calcium chloride, sodium chloride and potassium chloride. In the preferred embodiment of the present invention a 0.48 M to 0.50 M combined solution of 15% by weight of ammonium sulfate and about 7% by weight of sodium chloride is controllably permeated into the surface of the treated wood to impart flame resistance to the wood product.

It is believed that the combination of the ammonium salt and metal halide of a Group I or Group II metal of the Periodic Table of Elements reacts in accordance with the following general equation wherein, the ammonium salt is represented by the symbol $NH_4A$; the halide is represented by the symbol X and the Group I or Group II metal of the Periodic Table of Elements is represented by the symbol Me:

$$MeX + NH_4A \rightarrow MeA + NH_4X$$

In the preferred embodiment of the invention the metal halide is sodium chloride and the ammonium salt is ammonium sulfate which is believed to react in and about the cellular structure of the wood in accordance with the general equation:

$$(NH_4)_2SO_4 + 2NaCl \rightarrow Na_2SO_4 + 2NH_4Cl$$

The combined salt solution and the above reaction products which are believed to precipitate in the wood may be sealed into the cellular structure of the wood after controlled penetration to provide a fire resistant furniture product. The resulting fireproof wood product thereby produced is compatible with the finishing processes generally employed in the furniture industry.

One procedure for the evacuation and expansion of the cellular structure of the hardwood to enable it to receive the aforementioned fire retardant solution is by controlled permeation through exposed surfaces of the wood is accomplished by utilizing a vacuum vessel capable of withstanding a vacuum pressure of up to 30 inches of mercury. The description of vacuum and vacuum pressure as utilized herein is the measurement of the number of inches of mercury supported by the attained vacuum. In the present procedure hardwood furniture parts and lumber to be treated may be placed in the cylinder and a vacuum pressure of about 27 to 29 inches of mercury is applied to remove moisture and oxygen from the pores of the wood at or near the surface. The evacuation procedure not only evacuates the cellular structure of the wood but also expands the cellular structure to enable it to receive a flameproof solution as heretofore described. A minimum sized production vessel should be approximately 4 feet in diameter and about 46 feet long. It is to be understood that the dimensions of the vessel can be increased and decreased to suit production requirements, as long as the vessel is able to provide and maintain a suitable vacuum. For hardwoods a vacuum pressure in the range of about 22 to 30 inches of mercury is desirable. The vacuum may be accomplished by utilizing a number of techniques well-known in the prior art such as by employing an atomspheric condensor, barometric condensor or by utilizing a vacuum pump with the size of the equipment of course determining the speed of evacuation of the vessel.

The wood parts are placed in the vacuum vessel and a vacuum pressure of about 22 to 29 inches of mercury is pulled to remove all moisture and oxygen from the pores of the wood. The vessel containing the wood parts must remain under a vacuum until sufficient flame retardant compound is pumped into the vessel to cover all surfaces of the wood parts. The particular vacuum employed and the length of time the vacuum is held depends upon the moisture content of the wood and the depth of penetration desired as will be described hereinafter. Generally, the vacuum is maintained for a period of about 30 minutes to 60 minutes after the predetermined vacuum pressure is attained.

With some woods it is advantageous to first maintain a first vacuum pressure for removing moisture from the cellular structure of the wood and a second vacuum pressure for introducing the fire retardant solution into the cellular structure of the wood. With hardwoods a controlled penetration of about $\frac{1}{8}$ of an inch to $\frac{1}{4}$ of an inch can be obtained utilizing a vacuum pressure of 22 inches of mercury. Vacuum pressure of about 27 inches of mercury will provide a penetration of about $\frac{1}{2}$ an inch or greater when the vacuum is maintained for at least 30 minutes. While maintaining the predetermined vacuum the aforementioned fireproofing solution is pumped into the vessel at a temperature of about 100° F. or above. The advantages of the invention may be achieved by introducing the treating solution into the chamber at temperatures in the range of about 150° F. to 200° F. when a vacuum pressure of about 22 to 30 inches of mercury is employed. The temperature of the fireproofing solution imparts a pliability to the woods and promotes adsorption and absorption of the solution into the wood. As soon as the vessel is filled with the flame retardant compound the vacuum may be released to force the flame retardant into the pores of the wood.

Controlled penetration of hardwoods is also related to the time period for which the vacuum is held prior to the introduction of the flame retardant compound along with the species of the wood, the thickness or diameter of the wood and also its particular configuration. Generally, in fireproofing furniture a minimum of about $\frac{1}{8}$ of an inch of penetration is required to impart fireproofing to the treated wood product when the furniture parts have a thickness or diameter of about 2 inches to 3 inches. In the preferred embodiment of the invention about $\frac{1}{4}$ of an inch to $\frac{3}{4}$ of an inch penetration of furniture hardwoods on all exposed surface insures sufficient flame retardant compound to provide insulation of the core section of the wood from air necessary for combustion of the treated furniture while preventing the outside surfaces of the wood from burning in open flame at temperatures of about 3,000° F. The release of the vacuum creates a pressure which pushes the flame retardant chemical solution into the pores of the wood product.

In utilizing the process of the invention it is important that all of the wood parts in the vacuum chamber are covered with the fireproof chemicals to insure that exposed surfaces have the same degree of controlled permeation of fireproofing compounds. The controlled absorption and adsorption of fire retardant compounds into the cellular structure of the wood is preferably achieved by releasing a vacuum held for about 5 minutes to 10 minutes after the introduction of the fire retardant solution. The release of pressure allows the wood to adsorb and absorb the fire retardant compound according to its particular porosity and assists in reducing pressure stress to the cellular structure of the wood. As heretofore discussed the time for which a vacuum is held prior to the introduction of the treating solution depends on the desired depth of penetration. In hardwoods this period is generally in the range of about 2 to 2½ hours when a depth of penetration of about ½ of an inch to ¾ of an inch is desired by utilizing a vacuum pressure of about 22 inches of mercury. To obtain a penetration of about ½ inch a vacuum pressure of about 27 inches of mercury is held for a period of about 30 minutes prior to the introduction of the flame retardant compounds. In the preferred embodiment of the invention a vacuum pressure of about 25 inches to 27 inches of mercury is held for a period of about 25 minutes to 30 minutes before the flame retardant compounds are introduced into the vacuum chamber.

As will be recognized from the description of the controlled permeation in reference to the species of wood the amount of penetration depends on the species of wood, its thickness or diameter and its shape. Similarly, the amount of solids retention is related to the aforementioned factors. In this regard the total percent by weight increase should generally be about 12% to 14% while the percent by weight increase of the surface portion of the wood into which the flame retardant solution has been absorbed and adsorbed should be in a range of about 65% to about 95% by weight. The solids retention for the entire treated wood should be about 6 to 16 pounds per cubic foot. Once the vacuum pressure is fully released and the flame retardant compound absorbed and adsorbed into the cellular structure of the wood a second vacuum pressure of about 16 inches to 18 inches of mercury may be pulled to clean off excessive treating solution from the treated parts. This second vacuum is an optional procedure which assists in the final finishing of the furniture wood. The treated wood products may be dried by exposure to the atmosphere for about 48 hours to 72 hours or placed in a kiln for about 18 minutes to 24 minutes at from about 150° F. to 175° F. or dried by a combination of atmospheric drying and treatment in a kiln. After drying some of the wood products may exhibit a slight grain raising or some white blooming. This blooming and grain raising of the product does not interfere with the final products since products are generally sanded prior to being finished by utilizing techniques generally employed in the furniture industry. More particularly, the treated parts may be sealed by submersion of the parts in furniture finishing oils, varnishes or stains. The finishing techniques serve not only to provide luster and enhance the grain appearance generally associated with fine furniture products but also seals in the fire retardant compositions thereby preventing them from being subsequently leached out of the wood product.

Furniture and wood products treated utilizing the compositions and procedures of the invention not only exhibit resistance to fire but also are significantly strengthened and exhibit a marked decrease in the amount of smoke evolved when subjected to fire. In wood products prepared in accordance with the present invention flame tests were run on the product utilizing flame temperatures in excess of 3,000° F. for a period of 60 to 120 seconds which resulted in slight charring of the finish while the wood product would not ignite or burn.

The process of the invention for expanding and evacuating the cellular structure of hardwood and wood products prior to treatment with fire retardant compounds may also be accomplished by heating and subsequent immersion of the wood into a fire proofing solution. In this embodiment the wood or wood product is heated to a temperature of about 220° F. or above for a period of about 1½ hours to 2 hours to remove moisture in the wood and evacuate and expand the cellular structure of the wood product and activate the wood for introduction of the flame retardant solution. It will be understood that temperature and time described herein may be modified according to the species and condition of the wood. If for example, the wood is already wet, it may be desirable to first employ a series of drying steps to remove excessive moisture prior to heating to expand and evacuate the cellular structure of the wood.

Controlled permeation of the wood by heating and dipping is achieved under preferred conditions by heating the wood in the range of about 200° F. to 220° F. for about 1½ hours to 2 hours to provide a controlled permeation of about ⅛ of an inch to ¼ of an inch. This heat treatment accomplishes the expansion and evacuation of the cellular structure of the wood so that upon immersion in a salt solution as heretofore described and maintained at an ambient temperature forces the solution in the cellular structure of the wood. It is believed that when a fire retardant solution of sodium chloride and ammonium sulfate is employed as heretofore described results in the precipitation of ammonium halide salt in and around the cellular structure of the wood. For example, wood may be heated to about 220° F. for a period of at least 2 hours after which the wood is then completely immersed in the fire retardant chemical. The tank containing the fire retardant chemical is maintained at a temperature of about 70° to 80° F. so that wood upon contacting the cooler solution of the flame retardant chemical causes the compound to be drawn into the expanded cellular structure and upon contraction the cellular walls of the wood results in the controlled permeation of the fire retardant compound into the wood. The temperature differential in conjunction with the temperature of the treating solution is believed to assist the formation of the ammonium halide reaction product and controllably pulls the flame retardant compounds into the cellular structure of the wood.

After the flame retardant compound is introduced into the surface cellular structure of the treated wood product, the parts are then removed for subsequent drying either by utilizing atmospheric exposure for about 48 hours to 72 hours or dried in a kiln at 150° F. to 160° F. for about 18 to 24 minutes or a combination of drying in the atmosphere and kiln drying. After drying the wood product is then sanded and finished utilizing ordinary finishing techniques utilized in the furniture industry to not only seal in the flame retardant compound but also to provide the grain accentuation generally associated with fine furniture products. Once furniture products are finished the resulting fireproof furniture is indistinguishable from untreated furniture.

DETAILED DESCRIPTION OF THE INVENTION

The fireproofing of hardwoods of the type employed in the furniture industry has previously not been successfully accomplished since many of the procedures employed are inapplicable to hardwoods or interfere with the finishing of the wood product for purposes of furniture construction. The present invention by utilizing a combination of controlled permeation along with the fire retardant solutions of the invention allow for the production of hardwood furniture that are not only fire resistant and exhibit reduced quantities of smoke when subjected to burning but are also materially strengthened to enhance the durability and useful life of the furniture. It is believed the fire retardant compounds of the present invention and in particular the combination of sodium chloride and ammonium sulfate which precipitates ammonium sulfate is responsible for the remarkable fireproofing of treated wood by providing a resistant barrier not only within the cellular structure of the treated hardwood but also between the surface cellular structure and the internal core of the treated wood.

The fireproofing chemicals of the present invention are composed of a solution of a suitable vehicle into which a combination of a halide salt of a Group I or a Group II metal of the Periodic Table of Elements and an ammonium salt may be dissolved and which upon controlled permeation and reaction in the cellular structure of a wood product forms an ammonium halide. The composition of the flame retardant solution generally employed in the present invention is about 14% weight ammonium sulfate salt and about 26% salt of a halide of a Group I or Group II metal of the Periodic Table of Elements. In the preferred embodiment the salt solution is an aqueous solution of about 8% by weight ammonium sulfate and 7% by weight sodium chloride dissolved in water to prepare a combined solution of about 71 M to 75 M.

The process of the invention may utilize vehicles other than water such as, for example, alcohol or oils such as furniture finishing oils. In such instances the alcohol or oil alone may not be sufficient to dissolve the salts in which case a super saturated aqueous solution may be prepared which is then mixed with alcohol. As heretofore described, the controlled permeation and reaction of the salt solution in the expanded and evacuated cellular structure of the wood may be accomplished by utilizing either a vacuum process or a heat treatment of the wood or a combination thereof. In the application of the present invention it is preferred that the minimum temperature of the treating salt solution be from about 100° F. to 150° F. when utilizing a vacuum process and from about 70° F. to 80° F. when utilizing the dip process and from about 100° F. to 150° F. when utilizing a combined heat and vacuum process.

The controlled permeation process of the present invention may be utilized to treat softwoods and wood products such as particle board in addition to furniture hardwoods by penetrating the wood to a depth of about 1% to 40% of its thickness. In the case of softwoods penetration is about 10% to 40% of the thickness of the wood and preferably about 25% to 30% of the thickness of the wood. For hardwoods controlled penetration of about 1% to 30% and preferably about 3% to 25% of the thickness of the wood. The controlled permeation of the fire retardant compounds to the depths heretofore described not only impart fire resistance and decrease smoke evolved but also materially increase the strength of the treated wood by about 10 to 50%.

The following examples illustrate some of the methods employed for producing a fire retardant furniture product in accordance with the invention. Examples 14 and 16 illustrate the application of the invention to softwoods in providing the controlled permeation of the fire resistant compounds. The invention should not be considered as being limited by the following illustrative examples setting forth the particular fire retardant compositions and process conditions employed to obtain fire resistant wood products by utilizing a controlled permeation of the fire resistant composition into the exposed surfaces of the treated wood.

EXAMPLE 1

A fire retardant and wood strengthening stock solution of sodium chloride and ammonium sulfate was made up by adding 63 grams of sodium chloride (NaCl) and 32.25 grams of ammonium sulfate $(NH_4)_2SO_4$ per liter of water.

A portion of the fire retardant and wood strengthening stock solutions was employed to strengthen and fireproof oak wood of furniture quality by utilizing a controlled penetration to a depth of about ¼ of an inch on all exposed surfaces of the oak. About 6 board feed of oak having a 4 inch by 4 inch square dimension was placed in a vacuum chamber and evacuated to a vacuum pressure of 22 inches of mercury for a period of about 1½ hours. Thereafter, the fire retardant treating solution at 100° F. was introduced in the vacuum chamber at a vacuum pressure of 22 inches of mercury and the vacuum was released over a period of about 1 hour resulting in the treating solution being forced into the pores of the oak. The treated oak was removed from the vacuum vessel and thereafter dried by exposure to the atmosphere for about 6 hours and subsequently dried in a kiln at 130° F. for about 48 hours.

The fireproofed 4 inch by 4 inch cross-section oak exhibited about a ¼ of an inch penetration and after drying retained about 12.5 pounds of fire retardant compound per cubic foot of oak. The treated oak was sanded and treated utilizing an ordinary finish treatment generally employed for treating oak in the furniture industry consisting of submerging the sample in furniture finishing oil. The sample was thereafter tested for flame resistance by subjecting the treated oak to a flame temperature of about 2800° F. to 3000° F. for a minute resulting in a slight charring of the surface with a smoke density of about 10%. An untreated oak control burst into flames and evolved a smoke density of about 50%.

EXAMPLE 2

A portion of the fire retardant and wood strengthening solution of Example 1 was utilized to strengthen and impart flame resistance to about 6 board feet of furniture quality walnut. The walnut wood was placed in a vacuum chamber and evacuated to a vacuum pressure of 22 inches of mercury and allowed to remain in the vacuum chamber for about 1½ hours. Thereafter, the treating solution was introduced into the vacuum vessel at a temperature of 100° F. and the pressure released for a period of about 1 hour to yield a controlled penetration of about ⅜" about the entire surface of the walnut wood having a thickness of 4 inches and a width of 4 inches. The treating solution was forced into the expanded cellular structure of the wood by the release of the vacuum resulting in a retention of about 14 pounds of fire retardant compound per cubic foot of walnut after drying.

The treated walnut wood was removed and dried in a kiln for 72 hours at 130° F., and finished by immersing the treated wood into an ordinary oil finishing solution. The treated walnut was then subjected to heat and flame of a welding torch about 2800° F. to 3000° F. for a period of 2 minutes resulting in some charring of the surface and the evolution of smoke of about 10% density. The treated sample would not burn. An untreated walnut control sample burst into flames in about 48 seconds and evolved smoke of about 50% density which would re-ignite even after the flames were smothered.

EXAMPLE 3

An aliquot of the fire retardant and wood strengthening solution of Example 1 was utilized to strengthen and impart flame resistance to 6 board feet of furniture quality oak wood having a thickness of 4 inches and width of 4 inches. The oak was placed in a vacuum vessel and evacuated to a vacuum pressure of 28 inches of mercury for a period of about 1 hour to expand and remove the oxygen and fluid components from the cellular structure of the oak. Thereafter the treating solution was added at a temperature of 100° F. and the pressure removed for a period of about 1 hour by a pressure drop of about one half inch of mercury per minute to yield a penetration of about 1 inch throughout the surface of the treated oak.

The oak sample was then removed from the vacuum chamber, dried as described in Example 2 and found to exhibit a retention of 14.5 pounds of fire retardant compound per cubic foot of oak. The sample was subjected in an untreated condition to fire and heat tests by employing a welding torch flame of about 2800° F. to 3000° F. After prolonged exposure the sample evolved smoke of about 10% density but the treated walnut would not burn.

EXAMPLE 4

A portion of the treating solution of Example 1 was employed to fireproof 6 board feet of oak having a thickness of 4 inches and a width of 4 inches. The oak was placed in a vacuum chamber for about 1½ hours and evacuated to a vacuum pressure of 29 inches of mercury. Thereafter, the treating solution was introduced into the vacuum chamber at 100° F. and the pressure released over a period of about 1 hour. The oak wood treated at a vacuum pressure of 29 inches of mercury exhibited a 1 inch penetration on all exposed surfaces of the 4 inch×4 inch sample and thereafter dried in accordance with Example 2 and exhibited a retention of about 14.5 pounds of fire retardant compound per cubic foot of oak.

EXAMPLE 5

A flame retardant gum was prepared by placing 6 board feet of gum wood having a thickness of 4 inches and a width of 4 inches in a vacuum chamber and evacuating the chamber to about 22 inches of mercury vacuum pressure. Thereafter a portion of the fire retardant and wood strengthening solution of Example 1 was utilized to cover all exposed surfaces of the gum. The treating solution was introduced into the vacuum chamber at 100° F. and the vacuum was released over a period of about one hour. The treated gum exhibited a one inch penetration of the flame retardant compound around the exposed surfaces. The treated gum wood after drying in accordance with Example 2 exhibited a retention of about 12.5 pounds of fire retardant compound per cubic foot of gum. The treated gum was treated with an ordinary oil finish and subjected to a welding torch flame at a temperature of about 2800° F. to 3000° F. resulting in an evolution of smoke of a density of about 10% and some charring but the sample would not catch fire.

EXAMPLE 6

A portion of the fire retardant and wood strengthening stock solution of Example 1 was utilized to treat 6 board feet of ash wood having a width of 4 inches and a thickness of 4 inches. The ash wood was placed in a vacuum chamber and evacuated to a vacuum pressure of 28 inches of mercury and allowed to remain in the vacuum chamber for a period of about 1½ hours. The treating solution was added to the evacuated chamber at about 100° F. and the vacuum released to yield a treated ash wood having a penetration of about one inch on all exposed surfaces of the wood. The strengthened and fire retardant ash after drying in accordance with Example 2 retained about 12.5 pounds of fire retardant compound per cubic foot of ash wood.

EXAMPLE 7

An aliquot of the fire retardant and wood strengthening solution of Example 1 was employed to treat 6 board feet of birch wood having a width of 4 inches and height of 4 inches. The birch wood was placed in an evacuated chamber evacuated to a vacuum pressure of about 28 inches of mercury for about 1½ hours and the treating solution was introduced into the chamber at 100° F. The vacuum pressure of 28 inches of mercury was thereafter released over a period of one hour to yield a flame retardant birch wood having about one inch penetration throughout the exposed surfaces of the wood. The treated birch after drying in accordance with Example 2 retained about 12.0 pounds of flame retardant compound per cubic foot of birch wood.

EXAMPLE 8

A portion of the treating solution of Example 1 was employed to fireproof 6 board feet of elm wood. The elm wood having a 4 inch by 4 inch thickness and height was placed in a vacuum pressure for a period of 30 minutes. Thereafter, the treating solution was introduced into the evacuated vessel at a temperature of 100° F. and the pressure released over a period of about 1 hour. The treated elm after drying in accordance with Example 2 exhibited a one inch penetration and retained about 12.0 pounds of fire retardant compound per cubic foot of elm wood.

EXAMPLE 9

A portion of the fire retardant and wood strengthening solution of Example 1 was employed to treat 6 board feet of cherry wood. The cherry wood was 4 inches thick by 4 inches wide and was placed in a vacuum chamber and evacuated to a vacuum pressure of 29 inches of mercury over a period of 1½ hours. The treating solution was introduced into the vacuum chamber at 100° F. and the pressure was released over a period of about 1 hour. The fire retardant solution was forced into the pores of the cherry wood and yielded a ½" penetration throughout the surface area of the cherry wood and after drying in accordance with Example 2 yielding a retention of 8.5 pounds of fire retardant compound per cubic foot of cherry wood.

EXAMPLE 10

Teak wood was rendered fire retardant by utilizing a portion of the fireproofing and strengthening solution of Example 1. About 6 board feet of teak wood having a width of about 4 inches and a height of about 4 inches was placed in a vacuum chamber evacuated to a vacuum pressure of 29 inches of mercury for a period of about 2 hours. Thereafter the treating solution was introduced into the evacuated chamber at 100° F. and the vacuum pressure was released over a period of about 1 hour. The fireproofed teak wood exhibited a fire retardant solution penetration of about ¼ inch and after drying in accordance with Example 2 retained about 8.0 pounds of fire retardant compound per cubic foot of teak wood.

EXAMPLE 11

A portion of the treating solution of Example 1 was utilized to fireproof and strengthen 6 board feet of maple. The maple sample had 4 inch by 4 inch height and width and was placed in a vacuum chamber and evacuated to a vacuum pressure of 28 inches of mercury. The treating solution was introduced at a temperature of 100° F. to cover all parts of the wood in the vacuum chamber. The pressure was released over a period of about one hour and after drying in accordance with Example 2 yielded a fireproofed and strengthened maple product having a one inch penetration of the fire retardant compound into the surface and subsurface cellular structure of the maple wood. The treated maple retained 12.0 pounds of fire retardant compound per cubic foot of maple wood.

EXAMPLE 12

In this example 6 board feet of gum wood having a 4 inch width and 4 inch height was placed in a vacuum chamber evacuated to a vacuum pressure of 29 inches of mercury over a period of 1½ hours and a portion of the fire retardant and strengthening solution of Example 1 was introduced into the vacuum chamber at 100° F. and the pressure of the evacuated chamber was released over a period of about 1 hour to provide a one inch surface penetration of fire retardant compound throughout the exposed surface of the gum wood. The fire retardant gum was thereafter dried utilizing a procedure similar to Example 2 and found to exhibit a retention of 14.0 pounds of fire retardant compound per cubic foot of gum wood.

EXAMPLE 13

Lemon wood was strengthened and rendered fire resistant by treatment with a portion of the solution of Example 1. A sample of 6 board feet of lemon wood having a 4 inch width and a 4 inch height was placed in a vacuum chamber and evacuated to a vacuum pressure of 29 inches of mercury which was maintained for about 1½ hours. The treating solution was thereafter introduced into the vacuum chamber at about 100° F. to cover the lemon wood and the pressure was thereafter gradually released over a period of about 1 hour. The strengthened and fire retardant lemon wood exhibited a ½ inch penetration of fire retardant compound throughout all exposed surfaces of the wood. The lemon wood was dried utilizing a procedure similar to Example 2 and found to exhibit a retention of about 10.5 pounds of fire retardant compound per cubic foot of lemon wood.

EXAMPLE 14

Controlled penetration of a portion of the fire retardant solution of Example 1 was utilized to prepare a pine fire resistant wood. A sample of 6 board feet of pine of a cylindrical configuration having a 6 inch diameter was subjected to a vacuum pressure of about 22 inches of mercury for about 1½ hours. The fire retardant solution was added at a temperature of about 100° F. The pressure was thereafter released over a period of about 1 hour to yield a fire retardant penetration of about 2 inches on all exposed surfaces of the pine. The pine was thereafter dried in a manner similar to Example 2 and found to have a retention of 16.0 pounds of fire retardant compound per cubic foot of pine wood.

The fireproofed and strengthened pine was subjected to a heat and fire test by employing a flame of about 2800° F. to 3000° F. from a welding torch. After 2 minutes of heat and flame the treated pine would not burn and evolved smoke of 10% density. An untreated control sample burned after a thirty second exposure to the flame.

EXAMPLE 15

In this example a willow wood was fireproofed and strengthened utilizing a part of the solution prepared in Example 1. A sample of 6 board feet of willow wood of a cylindrical configuration having a 6 inch diameter was placed in a vacuum chamber evacuated to a pressure of 22 inches of mercury for a period of about 1 hour. The willow wood was covered with the flame retardant solution introduced into the evacuated chamber at 100° F. The pressure was thereafter released over a period of about 1 hour and resulted in a penetration of about 2 inches throughout the exposed surface of the willow wood.

The flame retardant willow wood was thereafter dried in the manner as described in Example 2 and found to have a retention of 16.0 pounds of fire retardant compound per cubic foot of willow wood.

EXAMPLE 16

A portion of the treating solution of Example 1 was utilized to fireproof and strengthen fir wood. A sample of 6 board feet having a width of 4 inches and a height of 4 inches was placed in a chamber and evacuated to a vacuum pressure of 22 inches of mercury. After evacuation for a period of about 1 hour the treating solution was introduced into the chamber at 100° F. and the pressure was released over a period of about 1 hour. The treated fir exhibited a controlled penetration of about 1 inch throughout the entire exposed surface area of the fir. The fir was dried in a manner as described in Example 2 and found to have a retention of 14.0 pounds of fire retardant compound per cubic foot of fir wood.

EXAMPLE 17

In this example a piece of walnut wood of ½ inch wide and ½ inch thick was strengthened and fireproofed utilizing a portion of the fire retardant solution of Example 1. The strip of walnut was heated to 230° F. for a period of 1 hour to expand and evacuate the cellular structure of the walnut. The heated walnut was immersed into a bath of fire retardant solution maintained at ambient temperature.

The walnut sample was maintained in the fire retardant solution for 1 hour and exhibited at 3/16 of an inch penetration of the fire retardant compound into all exposed surfaces of the wood. The walnut was introduced into the flame of a welding torch at about 2800° F. to 3000° F. resulting in some charring of the surface and an evolution of smoke at a density of approximately 10% but the wood would not ignite.

EXAMPLE 18

A sample of oak of ½ inch wide and ½ inch thick was strengthened and fireproofed utilizing a portion of the fire retardant solution of Example 1. The oak sample was heated to 230° F. for a period of 1 hour and thereafter immersed in a solution of the fire retardant compounds maintained at ambient temperature.

The oak sample was maintained in the fire retardant solution for a period of 1 hour and exhibited a ⅛ of an inch penetration of the fire retardant compound into the cellular structure of the exposed parts of the wood.

EXAMPLE 19

A fire retardant solution was prepared by adding sodium chloride and ammonium sulfate to boiling water until a supersaturated solution was attained. The supersaturated salt solution was then dissolved in ordinary furniture finishing oil mixed into the salt solution at 220° F. A portion of this solution was cooled to ambient temperature and utilized as a fire retardant solution for a sample of walnut.

The furniture quality walnut sample of ½ inch wide and ½ inch thick was heated to a temperature of 220° F. for a period of 1 hour and thereafter immersed in a portion of the fire retardant solution maintained at ambient temperature. The walnut sample was maintained in the solution for 1 hour and exhibited a ⅛ inch penetration of fire retardant compound into the exposed surface of the wood. The fireproofed and hardened walnut was dried and subjected to a welding torch flame of about 2800° F. to 3000° F. whereupon smoke of approximately 10% density was evolved but the sample would not burn.

EXAMPLE 20

Oak of ½ inch wide and ½ inch thick was strengthened and made fire resistant by treating the wood with a second portion of the fire retardant solution in Example 19. The oak sample was heated and immersed in the fire retardant solution for the same period as in Example 1 and provided an ⅛ of an inch penetration of the fire retardant compound. The oak sample was dried and fire tested as in Example 19. Similarly, the oak sample would not burn.

EXAMPLE 21

In this example a piece of oak of 1¾ inches width and 1.625 inches thick was treated with a portion of the fire retardant and wood strengthening stock solution of Example 1. The cellular structure of the wood was expanded and evacuated in accordance with Example 18 to provide a controlled permeation of the solution to a depth of about 3/16 of an inch. The treated oak was thereafter dried and tested for strength against a similar piece of oak of 1.75 inches wide and 1.875 inches thick utilized as a control. The untreated oak withstood 10.8 moments, a maximum load of 955 and a pressure of 10,865 p.s.i. The smaller treated sample withstood 14.8 moments, a maximum load of 3,130 and 14,792 p.s.i. resulting in a calculated increase of strength of 27%.

It will be recognized that the present invention has a wide range of applicability and is susceptible to modification by those skilled in the art to include chemical compositions other than flame retardant compounds such as preservatives, and other compounds for unsealed lawn furniture and other such compounds to augment the physical characteristics of wood. The controlled permeation of such fluids into the wood enables hardwoods, and in particular furniture woods, to be treated, inexpensively finished and treated to produce furniture that is visually indistinguishable from untreated furniture. Furthermore, variations in the desired penetration of the flame retardant compound can be adjusted according to the species of wood, its density and the particular flame resistant standards that is desirable for the particular wood.

The advantages of the invention may further be enhanced by utilizing a combination of the pressure and temperature conditions to expand and evacuate the cellular structure of extremely dense woods such as teak and other wood exhibiting an extremely tough cellular structure when deeper controlled penetration is desired. It will be recognized from the invention that deep penetration of such woods, that is, more than 30% of the depth of exposed surfaces of such hardwood is generally not required since the fire retardant filled cellular structures of the wood insulate and prevent the absorption of oxygen to the center of the wood which is necessary for the combustion of the core of the cell from the inside out.

It will further be recognized that the invention may be modified to include treatments of woods with solvents other than water utilizing the controlled permeation of the flame retardant compositions into the expanded and evacuated cellulose structure of the wood. These and other modifications and application of the present invention may be made within the spirit and scope of the invention as defined in the appended claims.

What is claimed is:

1. A process for fireproofing and strengthening wood by employing controlled permeation of a fire retardant compound in the cellular structure of a wood comprising:

(a) evacuating and expanding the cellular structure of a wood by utilizing a sufficient amount of dry heat, vacuum or a combination thereof to activate the cellular structure of said wood for receiving a fire retardant solution to a depth of about 1% to 40% of the thickness of the treated wood;

(b) immersing said evacuated and expanded cellular structure of said wood in a fire retardant solution composed of a combination of a halide salt of a Group I or Group II metal and an ammonium salt to provide a reaction between said halide salt and said ammonium salt and deposit a reaction product in said cellular structure of said wood;

(c) dissipating said dry heat, vacuum or combination thereof after said evacuated and expanded cellular structure of said wood is immersed in said fire retardant solution to draw said fire retardant solution into said wood and deposit said reaction product; and (d) drying said wood by exposing said wood to the atmosphere or drying in a kiln for about 15 minutes to 72 hours at a temperature of from about 100° F. to 175° F. or a combination of said atmospheric and kiln drying.

2. The process of claim 1 for fireproofing and strengthening wood by employing a controlled permeation of a fire retardant compound into the cellular structure of a wood additionally comprising the step of sealing said fire retardant compound into said wood utilizing furniture finishing techniques.

3. The process of claim 1 for fireproofing and strengthening wood by employing a controlled permeation of a fire retardant compound into the cellular structure of a wood wherein said evacuating and expanding of said cellular structure of said wood is accomplished by utilizing a vacuum pressure of about 20 to 30 inches of mercury.

4. The process of claim 3 for fireproofing and strengthening wood by employing a controlled permeation of a fire retardant compound into the cellular structure of a wood wherein said vacuum is maintained for a period of about 1 to 4 hours prior to immersing said wood in a solution of said fire retardant compound.

5. The process of claim 4 for fireproofing and strengthening wood by employing a controlled permeation of a fire retardant compound into the cellular structure of a wood wherein said evacuated and expanded cellular structure of said wood is covered with said treating solution at a temperature in the range of about 80° F. to 200° F.

6. The process of claim 5 for fireproofing and strengthening wood by employing a controlled permeation of a fire retardant compound into the cellular structure of a wood wherein said vacuum is maintained for a period of about 5 to 10 minutes after said wood is immersed in said fire retardant solution.

7. The process of claim 3 for fireproofing and strengthening wood by employing a controlled permeation of a fire retardant compound into the cellular structure of a wood wherein said halide salt of a Group I or Group II metal is sodium chloride and said ammonium salt is ammonium sulfate.

8. The process of claim 7 for fireproofing and strengthening wood by employing a controlled permeation of a fire retardant compound into the cellular structure of a wood wherein said cellular structure of said wood is activated for receiving said fire retardant solution to a depth of about 2% to 30% of the thickness of the treated wood.

9. The process of claim 8 for fireproofing and strengthening wood by controlled permeation of a fire retardant compound into the cellular structure of a wood wherein said wood is a softwood and said cellular structure of said softwood is activated for receiving said fire retardant solution to a depth of about 10% to 35% of the thickness of the treated wood.

10. The process of claim 8 for fireproofing and strengthening wood by controlled permeation of a fire retardant compound into the cellular structure of a wood wherein said wood is a hardwood and said cellular structure of said hardwood is activated for receiving said fire retardant solution to a depth of about 1% to 25% of the thickness of the treated wood.

11. The process of claim 8 for fireproofing and strengthening wood by employing a controlled permeation of a fire retardant compound into the cellular structure of a wood further comprising the step of sealing said fire retardant compound in said cellular structure of the wood by immersing said treated wood in furniture finishing compounds.

12. The process of claim 1 for fireproofing and strengthening wood by employing a controlled permeation of a fire retardant compound into the cellular structure of a wood wherein said controlled permeation is achieved by utilizing dry heat to heat said wood to a temperature of about 200° F. to 250° F. for a period of about 1 to 5 hours before immersing said wood in said fire retardant solution.

13. The process of claim 12 for fireproofing and strengthening wood by employing a controlled permeation of a fire retardant compound into the cellular structure of a wood wherein said halide salt of a Group I or Group II metal is sodium chloride and said ammonium salt is ammonium sulfate.

14. The process of claim 13 for fireproofing and strengthening wood by employing a controlled permeation of a fire retardant compound into the cellular structure of a wood wherein said evacuated and expanded cellular structure of said wood is immersed in said fire retardant solution maintained at a temperature of about 50° F. to 100° F.

15. The process of claim 14 for fireproofing and strengthening wood by employing a controlled permeation of a fire retardant compound into the cellular structure of a wood wherein said salt solution of sodium chloride and ammonium sulfate is dissolved in furniture finishing oil.

16. The process of claim 14 for fireproofing and strengthening wood by employing a controlled permeation of a fire retardant compound into the cellular structure of a wood wherein said combined salt solution is about 7% by weight sodium chloride and about 15% by weight ammonium sulfate.

17. The process of claim 12 for fireproofing and strengthening wood by employing a controlled permeation of a fire retardant compound into the cellular structure of a wood further comprising the step of finishing said wood by employing furniture finishing techniques.

18. The product produced by the process of claim 1.

19. A process for fireproofing wood by controlled permeation of a fire retardant compound into the cellular structure of a wood comprising:

(a) evacuating and expanding the cellular structure of a wood by utilizing a vacuum in the range of about 20 to 30 inches of mercury for a period of about 30 minutes to 4 hours to activate the surface and a portion of the subsurface of said wood to receive a fire retardant solution to a depth of less than to the core of the wood and in the range of about 1/16 to 4 inches;

(b) covering said evacuated and expanded cellular structure of said wood with a fire retardant solution wherein said fire retardant solution comprises a combination of ammonium sulfate and a halide of a Group I or Group II metal of the Periodic Table of Elements;

(c) releasing said vacuum after said wood is covered with said treating solution;

(d) drying said wood by exposure to the atmosphere or drying said wood in a kiln for about 15 minutes to 72 hours at a temperature of from about 100° F. to 175° F. or a combination of said atmospheric and kiln drying; and (e) sealing said fire retardant compound into the cellular structure of the wood by employing furniture finishing techniques.

20. The process of claim 19 for fireproofing wood by controlled permeation of a fire retardant compound into the cellular structure of a wood wherein said fire retardant solution comprises a combination of ammonium sulfate and a chloride salt of a metal selected from the group of metals consisting of sodium, calcium and potassium.

21. The process of claim 20 for fireproofing wood by controlled permeation of a fire retardant compound into the cellular structure of a wood wherein said fire retardant solution has furniture oil as at least a part of the solvent.

22. The process of claim 19 for fireproofing wood by controlled permeation of a fire retardant compound into the cellular structure of a wood wherein said fire retardant solution is a combination of sodium chloride and ammonium sulfate.

23. The process of claim 21 for fireproofing wood by controlled permeation of a fire retardant compound into the cellular structure of the wood wherein said fire retardant solution is introduced into the vacuum chamber at about 100° F. to 200° F.

24. The process of claim 23 for fireproofing wood by controlled permeation of a fire retardant compound into the cellular structure of a wood wherein said wood is a softwood having a thickness of about 6 to 10 inches and said depth of penetration is about 2 to 3 inches.

25. The process of claim 23 for fireproofing wood by controlled permeation of a fire retardant compound into the cellular structure of a wood wherein said wood is a hardwood having a thickness of about 1 to 4 inches and said depth of penetration is about 1/16 to 1 inch.

26. The process of claim 19 for fireproofing wood by controlled permeation of a fire retardant compound into the cellular structure of a wood further comprises the step of utilizing a second vacuum pressure of about 16 to 18 inches of mercury to remove excessive fire retardant solution from treated parts.

27. The product produced by the process of claim 19.

28. A process for fireproofing wood by controlled permeation of a fire retardant compound into the cellular structure of a wood comprising:

(a) evacuating and expanding the cellular structure of a wood by utilizing dry heat in the temperature range of about 200° F. to 260° F. for a period of about 1 to 4 hours to activate the surface and a portion of the subsurface of said wood to receive a fire retardant solution to a depth of less than to the core of the wood and in a range of about 1/16 to 4 inches;

(b) covering said evacuated and expanded cellular structure of said wood with a fire retardant solution wherein said fire retardant solution comprises a combination of ammonium sulfate and a halide of a Group I or Group II metal of the Periodic Table of Elements;

(c) dissipating said dry heat as said wood is immersed in said fire retardant solution;

(d) drying said wood by exposure to the atmosphere or drying said wood in a kiln for about 15 minutes to 72 hours at a temperature of from about 100° F. to 175° F. or a combination of said atmospheric and kiln drying; and (e) sealing said fire retardant compound into the cellular structure of the wood by employing ordinary furniture finishing techniques.

29. The process of claim 28 for fireproofing wood by controlled permeation of a fire retardant compound into the cellular structure of a wood wherein said fire retardant solution comprises a combination of ammonium sulfate and a chloride salt of a metal selected from the group of metals consisting of sodium calcium and potassium.

30. The process of claim 29 for fireproofing wood by controlled permeation of a fire retardant compound into the cellular structure of a wood wherein said fire retardant solution has furniture oil as at least a part of the solvent.

31. The process of claim 28 for fireproofing wood by controlled permeation of a fire retardant compound into the cellular structure of a wood wherein said fire retardant solution is a combination of sodium chloride and ammonium sulfate.

32. The process of claim 28 for fireproofing wood by controlled permeation of a fire retardant compound into the cellular structure of a wood wherein said fire retardant solution is in a temperature range of about 50° F. to 100° F. prior to covering said evacuated and expanded cellular structure of said wood.

33. The product produced by the process of claim 29.

* * * * *